(12) United States Patent
Fukunaga

(10) Patent No.: US 10,790,717 B2
(45) Date of Patent: *Sep. 29, 2020

(54) BUS BAR UNIT AND MOTOR

(71) Applicant: Nidec Corporation, Minami-ku Kyoto (JP)

(72) Inventor: Keisuke Fukunaga, Minami-ku Kyoto (JP)

(73) Assignee: NIDEC CORPORATION, Minami-Ku, Kyoto (JP)

( * ) Notice: Subject to any disclaimer, the term of this patent is extended or adjusted under 35 U.S.C. 154(b) by 91 days.

This patent is subject to a terminal disclaimer.

(21) Appl. No.: 15/956,088

(22) Filed: Apr. 18, 2018

(65) Prior Publication Data

US 2018/0233980 A1 Aug. 16, 2018

Related U.S. Application Data

(63) Continuation of application No. 15/031,072, filed as application No. PCT/JP2014/075389 on Sep. 25, 2014, now Pat. No. 9,979,249.

(30) Foreign Application Priority Data

Oct. 21, 2013 (JP) .................................. 2013-218195

(51) Int. Cl.
*H02K 3/28* (2006.01)
*H02K 3/52* (2006.01)
(Continued)

(52) U.S. Cl.
CPC ................. *H02K 3/28* (2013.01); *H02K 3/02* (2013.01); *H02K 3/522* (2013.01);
(Continued)

(58) Field of Classification Search
CPC .. H02K 3/00; H02K 3/02; H02K 3/28; H02K 3/52; H02K 3/521; H02K 3/522;
(Continued)

(56) References Cited

U.S. PATENT DOCUMENTS

| 4,926,075 A | 5/1990 | Fushiya et al. |
| 5,828,147 A | 10/1998 | Best et al. |

(Continued)

FOREIGN PATENT DOCUMENTS

| JP | 2003324883 A | 11/2003 |
| JP | 3717832 B2 | 11/2005 |

(Continued)

OTHER PUBLICATIONS

International Search Report corresponding to Application No. PCT/JP2014/075389; dated Dec. 16, 2014, with English translation.

(Continued)

*Primary Examiner* — Tran N Nguyen
(74) *Attorney, Agent, or Firm* — Cantor Colburn LLP

(57) ABSTRACT

A bus bar unit used in a motor comprising a coil may include a bus bar electrically connected to the coil of the motor; and a bus bar holder comprising a resin material and configured to hold the bus bar. The bus bar may include a plurality of bus bar members including a metal material. The plurality of bus bar members may include a first bus bar member which has a terminal portion connected to a lead wire configuring the coil, and a first connection portion. T connection portion may be configured by connecting the first connection portion of the first bus bar member and a second connection portion provided in a second bus bar member which is the other one of the plurality of bus bar members, and at least a portion of the connection portion of the bus bar is held in the bus bar holder.

17 Claims, 15 Drawing Sheets

(51) Int. Cl.
*H02K 3/02* (2006.01)
*H02K 11/00* (2016.01)
*H02K 15/00* (2006.01)

(52) U.S. Cl.
CPC ..... *H02K 11/0094* (2013.01); *H02K 15/0056* (2013.01); *H02K 2203/09* (2013.01); *Y02P 80/30* (2015.11)

(58) Field of Classification Search
CPC .... H02K 11/00; H02K 11/0094; H02K 15/00; H02K 15/0056
See application file for complete search history.

(56) References Cited

U.S. PATENT DOCUMENTS

| | | | |
|---|---|---|---|
| 6,856,057 B2 | 2/2005 | Kobayashi et al. | |
| 7,034,419 B2 | 4/2006 | Kabasawa et al. | |
| 7,518,853 B2 * | 4/2009 | Kato | H02K 3/522 310/68 R |
| 7,579,729 B2 | 8/2009 | Takashima et al. | |
| 7,595,572 B2 | 9/2009 | Haga et al. | |
| 8,836,186 B2 | 9/2014 | Katou et al. | |
| 8,922,080 B2 | 12/2014 | Nakagawa et al. | |
| 9,979,249 B2 * | 5/2018 | Fukunaga | H02K 3/522 310/71 |
| 2003/0201688 A1 * | 10/2003 | Yamamura | H02K 3/50 310/71 |
| 2004/0251752 A1 * | 12/2004 | Shinzaki | H02K 3/522 310/71 |
| 2007/0296292 A1 | 12/2007 | Kienzler et al. | |
| 2008/0136274 A1 | 6/2008 | Fujii et al. | |
| 2009/0026860 A1 | 1/2009 | Ohuchi et al. | |
| 2010/0033044 A1 | 2/2010 | Isshiki et al. | |
| 2012/0019081 A1 | 1/2012 | Tamura et al. | |
| 2012/0262014 A1 | 10/2012 | Katou et al. | |
| 2013/0181569 A1 | 7/2013 | Nakagawa et al. | |

FOREIGN PATENT DOCUMENTS

| | | |
|---|---|---|
| JP | 2007259642 A | 10/2007 |
| JP | 2007330035 A | 12/2007 |
| JP | 2008148481 A | 6/2008 |
| JP | 2009033850 A | 2/2009 |
| JP | 2010041898 A | 2/2010 |
| JP | 2010233327 A | 10/2010 |
| JP | 2010239771 A | 10/2010 |
| JP | 2011182511 A | 9/2011 |

OTHER PUBLICATIONS

International Search Report corresponding to Application No. PCT/JP2014/075390; dated Dec. 22, 2014, with English translation.
USPTO Notice of Allowance corresponding to U.S. Appl. No. 15/031,072; dated Jan. 22, 2018.
SIPO Office Action corresponding to Application No. 201810264158.8; dated Aug. 27, 2019.

* cited by examiner

BUS BAR UNIT AND MOTOR

CROSS REFERENCE TO RELATED APPLICATIONS

The present application is a continuation application of U.S. patent application Ser. No. 15/031,072, filed Apr. 21, 2016, the entire disclosure of which is hereby incorporated by reference. Application Ser. No. 15/031,072 is the U.S. national stage of application No. PCT/JP2014/075389, filed on Sep. 25, 2014. Priority under 35 U.S.C. § 119(a) and 35 U.S.C. § 365(b) is claimed from Japanese Applications No. 2013-218195, filed Oct. 21, 2013, the disclosure of which is incorporated herein by reference.

FIELD OF THE DISCLOSURE

The present disclosure relates to a bus bar unit and a motor.

BACKGROUND

The existing motor having a structure in which a conductive part called a bus bar is disposed above a coil and the coil is electrically connected to an external power supply through the conductive part has been known. Generally, the bus bar is formed by punching copper plates with a press or the like. However, the existing bus bar has a complicated shape in which it three-dimensionally extends in a circumferential direction, an axial direction, and a radial direction with respect to a center axis of the motor. For this reason, a lot of wasteful portions may occur in the copper plate, which is a raw material, and a yield of the material may be aggravated.

In this respect, Japanese Patent Laid-Open Publication No. 2010-239771 discloses an annular power feeding member in which end portions of a plurality of arc-shaped bar members are connected to each other. The above publication discloses that since two end portions are present for one arc-shaped bar member, there is no need to perform complicated bending machining at the time of manufacturing the annular power feeding member. Further, it is disclosed that the waste of material may be minimally suppressed.

In the structure disclosed in the above Japanese Patent Laid-Open Publication No. 2010-239771, a connected portion between the arc-shaped bar members is exposed to an outside of a holding member for the power feeding member made of a resin material. For this reason, in the structure of the above publication, the connected portion between the arc-shaped bar members needs to be rigid to withstand a shock upon driving of the motor or conveyance.

SUMMARY

A first exemplary embodiment of the present disclosure relates to a bus bar unit used in a motor. The bus bar unit includes a bus bar and a bus bar holder. The bus bar is electrically connected to a coil of the motor. The bus bar holder is made of a resin material and holds the bus bar. The bus bar has a plurality of bus bar members made of a metal material. The plurality of bus bar members includes a radial branch extending in a radial direction, a circumferential branch expanded in a circumferential direction, and a bent portion interposed between one end portion of the radial branch and one end portion of the circumferential branch. The bent bus bar member has the bent portion. The radial branch has a terminal portion provided at the other end portion thereof. The terminal portion is connected to a lead wire configuring the coil. The circumferential branch has a first connection portion provided at the other end portion thereof. A connection portion is configured by connecting the first connection portion of the bent bus bar member to a second connection portion installed on the other one of the plurality of bus bar members. Further, at least a portion of the connection portion of the bus bar is held in the bus bar holder.

The above and other elements, features, steps, characteristics and advantages of the present disclosure will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, exemplary embodiments of the present disclosure will be described with reference to the accompanying drawings. Further, in in the following descriptions, a direction parallel with a center axis of a motor is called an [axial direction], a direction orthogonal to the center axis of the motor is called a [radial direction], and a direction along an arc of the center axis of the motor is called a [circumferential direction]. Further, in the following descriptions, a shape or a positional relation of each part will be described by defining the axial direction as a vertical direction and disposing a bus bar unit above a coil. However, the definition of the vertical direction is not intended to limit a direction when manufacturing and using a motor according to the present disclosure.

The description of [parallel direction] in the present disclosure may include other substantially parallel directions. Further, the [orthogonal direction] in the present disclosure may include other substantially orthogonal directions.

1. First Embodiment

Figure 1:
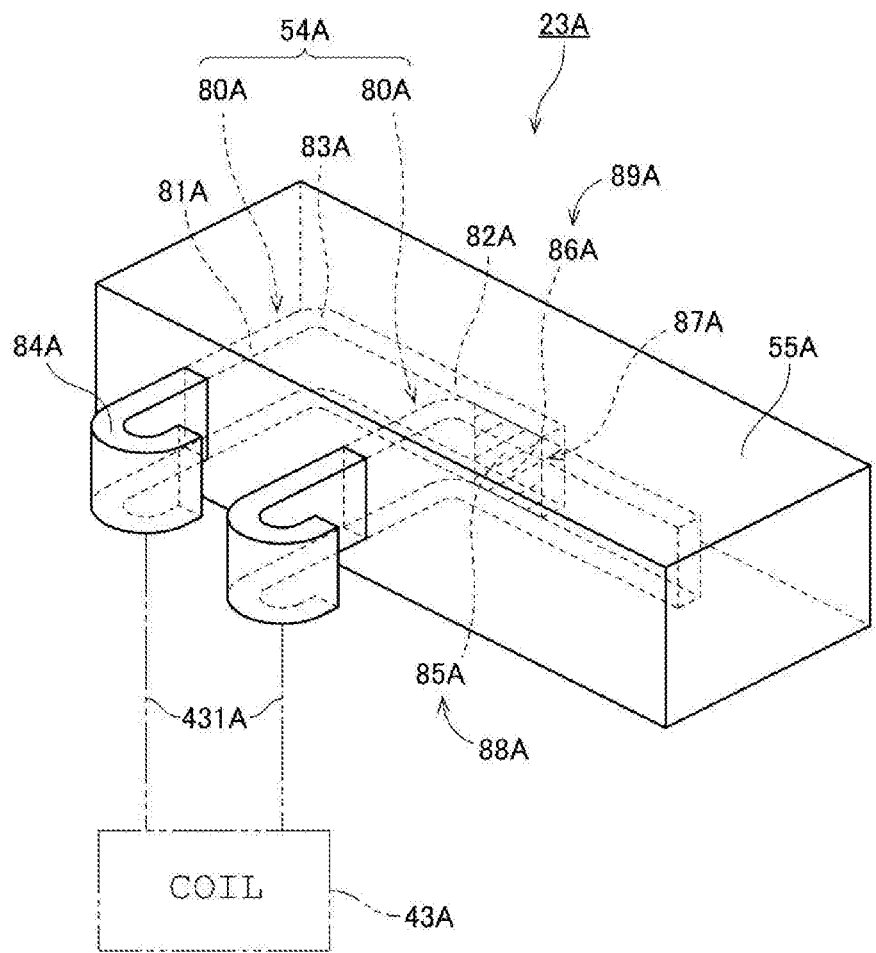
FIG. 1 is a perspective view of a bus bar unit according to a first embodiment.

FIG. 1 is a perspective view of a bus bar unit 23A according to a first embodiment of the present disclosure. The bus bar unit 23A is used in a motor. The bus bar unit 23A serves to electrically connect a coil 43A to an external power supply. As illustrated in FIG. 1, the bus bar unit 23A has a bus bar 54A and a bus bar holder 55A. The bus bar holder 55A is made of a resin material and holds the bus bar 54A.

The bus bar 54A of FIG. 1 has two bus bar members 80A made of a metal material. Each of the two bus bar members 80A has a radial branch 81A extending in a radial direction and a circumferential branch 82A expanding in a circumferential direction. A bent portion 83A is interposed between one end portion of the radial branch 81A and one end portion of the circumferential branch 82A. That is, according to this embodiment, the two bus bar members 80A all are a bent bus bar member which has the radial branch 81A, the circumferential branch 82A, and the bent portion 83A. These bent bus bar members are molded from a linear member. For this reason, a board may be perforated without being wasted, thereby increasing a yield. Further, since these bent bus bar members have the same shape, the yield may be more increased. In addition, since an individual linear member is a small member, the board may be perforated without a gap, thereby increasing the yield.

The radial branch 81A has a terminal portion 84A provided at the other end portion of an opposite side to the bent portion 83A. The terminal portion 84A is electrically connected to a lead wire 431A configuring the coil 43A. Further, the circumferential branch 82A of the one bus bar member 80A has a first connection portion 88A provided at the other end portion of the opposite side to the bent portion 83A. The first connection portion 88A and the second connection portion 89A are connected to each other to configure a connection portion 87A. The second connection portion 89A is disposed on the other bus bar member 80A of the two bus bar members 80A. Further, at least a portion of the connection portion 87A is held in the bus bar holder 55A. By doing so, it is possible to increase strength of the bus bar 54A against a shock. Further, the terminal portion 84A is not covered with resin of the bus bar holder 55A but is exposed.

According to this embodiment, the first connection portion 88A has a first connection surface 85A. The second connection portion 89A has a second connection surface 86A. As such, each connection portion has the connection surface to be able to more firmly connect between the connection surfaces.

2. Second Embodiment

<2-1. Overall Structure of Motor>

Figure 2:
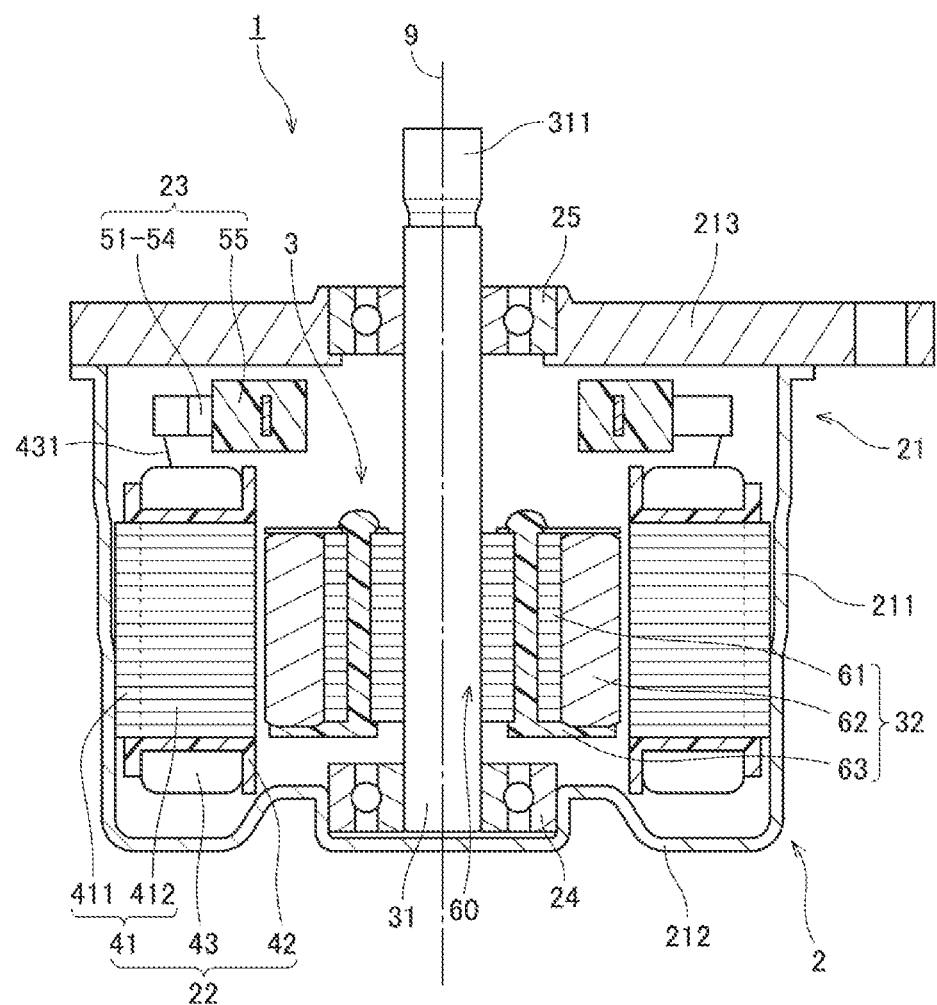
FIG. 2 is a longitudinal cross-sectional view of a motor according to a second embodiment.

Next, a second embodiment of the present disclosure will be described. FIG. 2 is a longitudinal cross-sectional view of the motor 1 according to the second embodiment. According to this embodiment, the motor 1 is equipped in, for example, a vehicle and is used to generate a driving force of a power steering. However, the motor of the present disclosure may also be used for purposes in addition to the power steering. For example, the motor of the present disclosure may also be used as a driving source for other portions of a vehicle, for example, a fan for engine cooling or an oil pump. As the motor of the present disclosure, any motor which is equipped in home electronics, OA equipments, medical instruments, etc., and generates various kinds of driving forces may be used.

The motor 1 is a so-called inner rotor type motor in which a rotor 32 is disposed on a radially inner side of a stator 22. As illustrated in FIG. 2, the motor 1 has a stationary unit 2 and a rotary unit 3. The stationary unit 2 is fixed to an edge body of a device to be driven. The rotary unit 3 is rotatably supported by the stationary unit 2.

The stationary unit 2 has a housing 21, the stator 22, a bus bar unit 23, a lower bearing portion 24, and an upper bearing portion 25.

The housing 21 has a cylindrical portion 211, a bottom plate portion 212, and a cover portion 213. The cylindrical portion 211 extends in a substantially cylindrical shape from a radially outer side of the stator 22 and the bus bar unit 23 in the axial direction. The bottom plate portion 212 is expanded substantially vertically to a center axis 9 from a lower portion of the stator 22 and the rotor 32, which will be described in more detail in a subsequent section. The cover portion 213 is expanded substantially vertically to the center axis 9 from an upper portion of the bus bar unit 23. The stator 22, the bus bar unit 23, and the rotor 32, which will be described in more detail in a subsequent section, are accommodated in the housing 21.

The cylindrical portion 211, the bottom plate portion 212, and the cover portion 213 are made of metals such as aluminum and stainless. In this embodiment, the cylindrical portion 211 and the bottom plate portion 212 are configured of a single member and the cover portion 213 is configured of a separate member from the cylindrical portion 211 and the cover portion 213. However, the cylindrical portion 211 and the cover portion 213 may be configured of a single member and the bottom plate portion 212 may be configured of a separate member from the cylindrical portion 211 and the cover portion 213.

The stator 22 is disposed on a radially outer side of the rotor 32, which will be described in more detail in a subsequent section. The stator 22 has a stator core 41, an insulator 42, and a plurality of coils 43. The stator core 41 is configured of a stacked steel sheet in which electromagnetic steel sheets are stacked axially. The stator core 41 has an annular core back 411 and a plurality of teeth 412. The core back 411 is disposed at substantially the same axis with the center axis 9. An outer circumferential surface of the core back 411 is fixed to an inner circumferential surface of the cylindrical portion 211 of the housing 21. The plurality of teeth 412 protrude radially inward from the core back 411. The plurality of teeth 412 are arranged at a substantially equal interval in the circumferential direction.

The insulator 42 is made of resin which is an insulator. Upper surfaces and lower surfaces of each tooth 412 and both end surfaces in the circumferential direction thereof are covered with the insulator 42. The coil 43 is configured of a lead wire 431 wound around the insulator 42. That is, according to this embodiment, the lead wire 431 is wound around the teeth 412, which is a magnetic core, through the insulator 42. The insulator 42 is interposed between the teeth 412 and the coil 43 to prevent the teeth 412 and the coil 43 from being electrically short-circuited.

Further, instead of the insulator 42, a surface of the teeth 412 may suffer from insulating coating.

The bus bar unit 23 has bus bars 51 to 54 made of metals such as copper which is a conductor and a bus bar holder 55 made of a resin material and holding the bus bars 51 to 54. The bus bars 51 to 54 are electrically connected to the lead wire 431 configuring the coil 43. Upon the use of the motor 1, the lead wire extending from the external power supply is connected to the bus bars 51 to 54. That is, the coil 43 and the external power supply are electrically connected to each other through the bus bars 51 to 54.

In FIG. 2, the bus bar unit 23 is disposed above the stator 22 and below the cover portion 213. However, the bus bar unit 23 may be disposed above the cover portion 213. A more detailed structure of the bus bar unit 23 will be described below.

The lower bearing portion 24 and the upper bearing portion 25 are disposed between the housing 21 and the shaft 31 of the rotary unit 3. According to this embodiment, as the lower bearing portion 24 and the upper bearing portion 25, a ball bearing is used. The ball bearing rotates an outer wheel and an inner wheel with respect to each other through a spherical body. By doing so, the shaft 31 is rotatably supported by the housing 21. However, instead of the ball bearing, other bearings such as a sliding bearing and a hydraulic bearing may be used as the lower bearing portion 24 and the upper bearing portion 25.

According to this embodiment, the rotary unit 3 has the shaft 31 and the rotor 32.

The shaft 31 is a columnar member extending along the center axis 9. The shaft 31 is preferably made of stainless steel. The shaft 31 rotates about the center axis 9, while being supported by the above-mentioned lower bearing portion 24 and upper bearing portion 25. An upper end portion 311 of the shaft 31 protrudes above the cover portion 213. The upper end portion 311 is connected to an apparatus to be driven through a power delivery mechanism such as a gear.

The rotor 32 is positioned on a radially inner side of the stator 22 and rotates simultaneously with the shaft 31. The rotor 32 has a rotor core 61, a plurality of magnets 62, and a magnet holder 63. The rotor core 61 is configured of a stacked steel sheet in which electromagnetic steel sheets are stacked axially. A center of the rotor core 61 is provided with an insertion hole 60 extending axially. The shaft 31 is press-fitted into the insertion hole 60. By doing so, the rotor core 61 and the shaft 31 are fixed to each other.

The plurality of magnets 62 are fixed to an outer circumferential surface of the rotor core 61 by, for example, an adhesive. A surface on a radially outer side of each magnet 62 becomes a magnetic pole surface facing an end surface on a radially inner side of the teeth 412. The plurality of magnets 62 are arranged in a circumferential direction, and N poles and S poles thereof are alternately arranged. Further, instead of the plurality of magnets 62, one annular magnet in which the N poles and the S poles are alternately magnetized in a circumferential direction may be used in the rotor 32.

The magnet holder 63 is a member made of a resin material and fixed to the rotor core 61. The magnet holder 63 is obtained by being insert-molded using the rotor core 61 as an insert portion. Lower surfaces of the plurality of magnets 62 and both end surfaces in a circumferential direction thereof come in contact with the magnet holder 63. By doing so, each magnet 62 is positioned in the circumferential direction and the axial direction. Further, the rigidity of the whole rotor 32 is increased by the magnet holder 63.

If the coil 43 is supplied with a driving current from the external power supply through the bus bars 51 to 54, a magnetic flux is generated in the plurality of teeth 412 of the stator core 41. Further, a torque in the circumferential direction is generated between the rotor 32 and the stator 22 by an action of the magnetic flux between the teeth 412 and the magnet 62. As a result, the rotary unit 3 rotates about the center axis 9, relative to the stationary unit 2.

<2-2. Connection Configuration of Coil>

Figure 3:
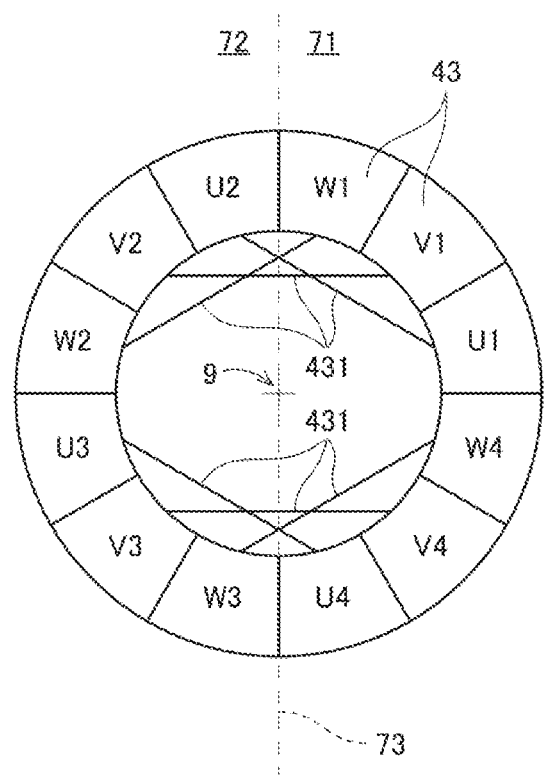
FIG. 3 is a diagram conceptually illustrating a connection structure of a coil according to a second embodiment.
Figure 4:
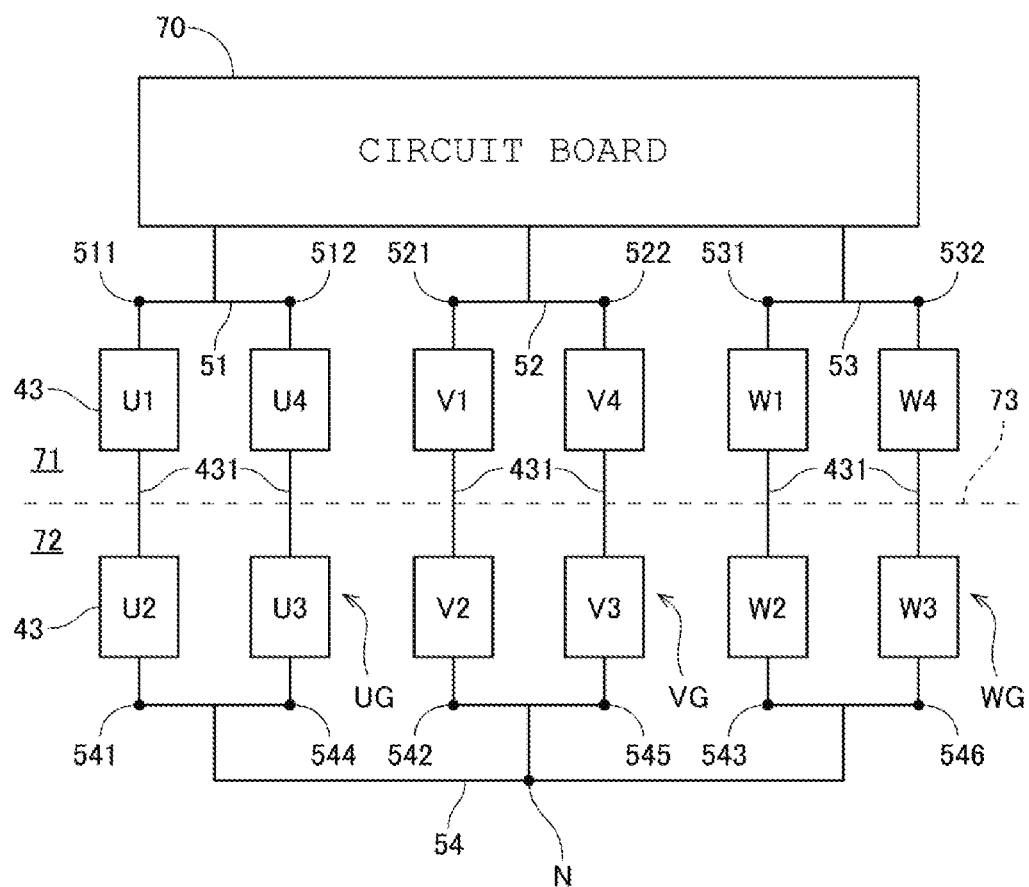
FIG. 4 is a diagram conceptually illustrating a connection structure of a coil according to a second embodiment.

According to this embodiment, the motor 1 is a 3-phase synchronous motor which is driven with a 3-phase alternating current of a U phase, a V phase, and a W phase. FIGS. 3 and 4 are diagrams conceptually illustrating the connection configuration of the lead wire 431 configuring the coil 43. As illustrated in FIGS. 3 and 4, the stator 22 has 12 coils 43. The 12 coils 43 includes four U-phase coils 43 U1 to U4, four V-phase coils 43 V1 to V4, and four W-phase coils 43 W1 to W4. These coils 43 are arranged in a circumferential direction at an equal angle interval in order of U1, V1, W1, U2, V2, W2, U3, V3, W3, U4, V4, and W4.

As conceptually illustrated in FIG. 3, six pairs of coils of U1 and U2, U3 and U4, V1 and V2, V3 and V4, W1 and W2, and W3 and W4 are each configured of one continued lead wire 431. That is, as illustrated in FIG. 4, these six pairs of coils are each connected to each other in series. The coil pair of U1 and U2 and the coil pair of U3 and U4 are connected to each other in parallel to form a U-phase coil group UG. Further, the coil pair of V1 and V2 and the coil pair of V3 and V4 are connected to each other in parallel to form a V-phase coil group VG. Further, the coil pair of W1 and W2 and the coil pair of W3 and W4 are connected to each other in parallel to form a W-phase coil group WG.

One end portion of the U-phase coil group UG, one end portion of the V-phase coil group VG, and one end portion of the W-phase coil group WG are electrically connected to a circuit board 70 including a microcontroller. Further, the other end portion of the U-phase coil group UG, the other end portion of the V-phase coil group VG, and the other end portion of the W-phase coil group WG are electrically connected to one another at a neutral point N. That is, in this embodiment, the U-phase coil group UG, the V-phase coil group VG, and the W-phase coil group WG are connected to one another by a Y connection.

As illustrated in FIGS. 3 and 4, the coils 43 U1, V1, W1, U4, V4, and W4 of one side of each coil pair is disposed in a first space 71. The first space 71 is one space divided by a plane 73 including the center axis 9. All of the coils 43 U1, V1, W1, U4, V4, and W4 of one side of each coil pair are connected to the circuit board 70. In this embodiment, the coils 43 U2, V2, W2, U3, V3, and W3 of the other side of each coil pair is disposed in a second space 72. The second space 72 is one space divided by the above-mentioned plane 73. All the coils 43 U2, V2, W2, U3, V3, and W3 of the other side of each coil pair are coils connected to the neutral point N.

<2-3. Configuration of Bus Bar Unit>

Figure 5:
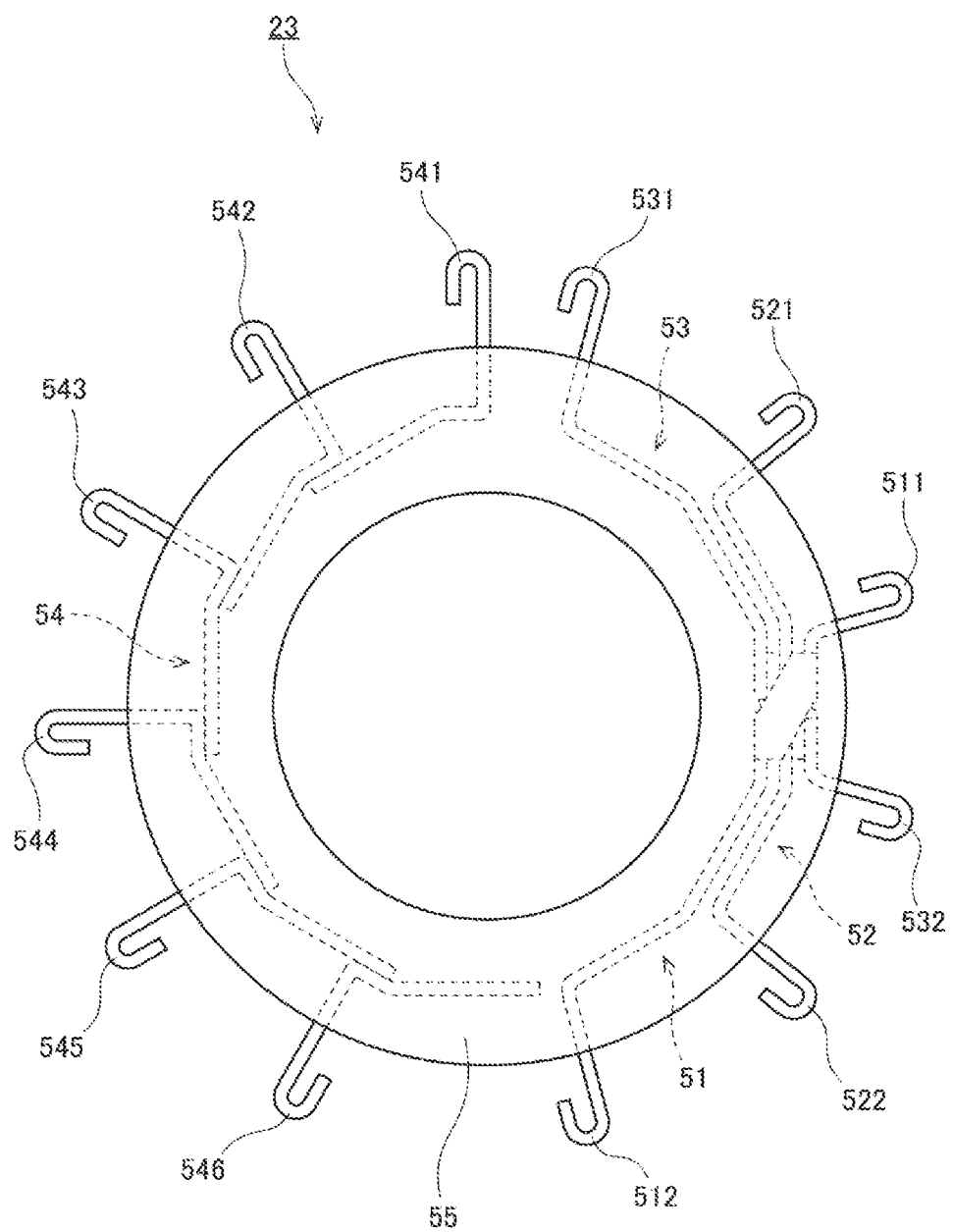
FIG. 5 is a top view of a bus bar unit according to a second embodiment.

Next, a configuration of the bus bar unit 23 used in the motor 1 will be described. FIG. 5 is a top view of the bus bar unit 23. As illustrated in FIG. 5, the bus bar unit 23 has a U phase bus bar 51, a V phase bus bar 52, a W phase bus bar 53, a neutral point bus bar 54, and the bus bar holder 55 holding these bus bars 51 to 54. The bus bar holder 55 is a resin molding product using portions of each of the U phase bus bar 51, the V phase bus bar 52, the W phase bus bar 53, and the neutral point bus bar 54 as an insert portion.

The U phase bus bar 51 has two U phase terminal portions 511 and 512. The two U phase terminal portions 511 and 512 are disposed in the above-mentioned first space 71. The U phase terminal portions 511 and 512 are each connected to end portions of the lead wires 431 drawn out from each coil 43 of U1 and U4. That is, as illustrated in FIG. 4, the circuit board 70 and each coil 43 of U1 and U4 are electrically connected to each other through the U phase bus bar 51.

The V phase bus bar 52 has two V phase terminal portions 521 and 522. The two V phase terminal portions 521 and 522 are disposed in the above-mentioned first space 71. The V phase terminal portions 521 and 522 are each connected to the end portions of the lead wires 431 drawn out from each coil 43 of V1 and V4. That is, as illustrated in FIG. 4, the circuit board 70 and each coil 43 of V1 and V4 are electrically connected to each other through the V phase bus bar 52.

The W phase bus bar 53 has two W phase terminal portions 531 and 532. The two W phase terminal portions 531 and 532 are disposed in the above-mentioned first space 71. The W phase terminal portions 531 and 532 are each connected to the end portions of the lead wires 431 drawn out from each coil 43 of W1 and W4. That is, as illustrated in FIG. 4, the circuit board 70 and each coil 43 of W1 and W4 are electrically connected to each other through the W phase bus bar 53.

The neutral point bus bar 54 has six neutral point terminal portions 541 to 546. The six neutral point terminal portions 541 and 546 are disposed in the above-mentioned second space 72. The six neutral point terminal portions 541 to 546 are each connected to the end portions of the lead wires 431 drawn out from each coil 43 of U2, V2, W2, U3, V3, and W3. That is, as illustrated in FIG. 4, the neutral point N and each coil of U2, V2, W2, U3, V3, and W3 are electrically connected to each other through the neutral point bus bar 54.

Figure 6:
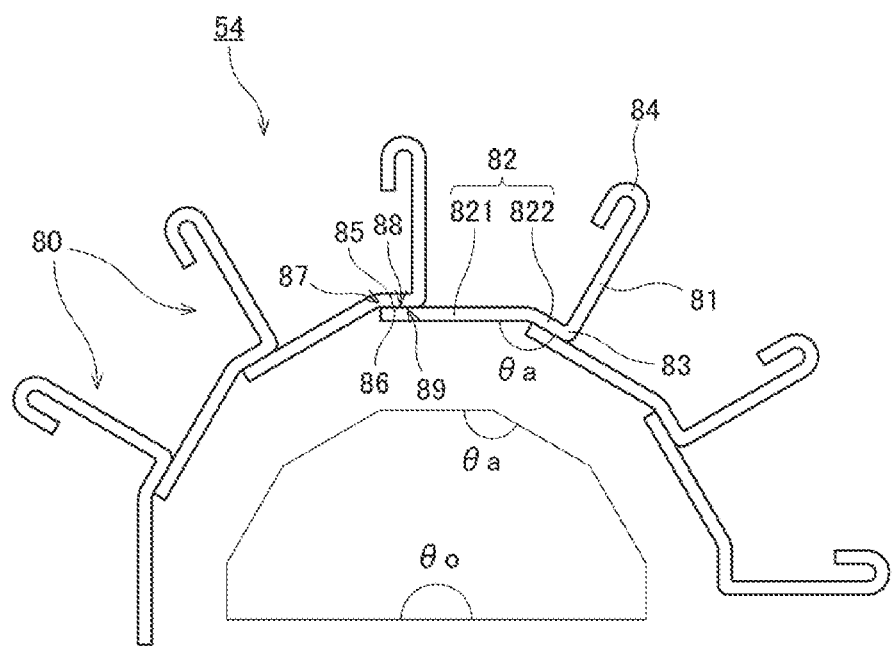
FIG. 6 is a top view of a neutral point bus bar according to a second embodiment.
Figure 7:
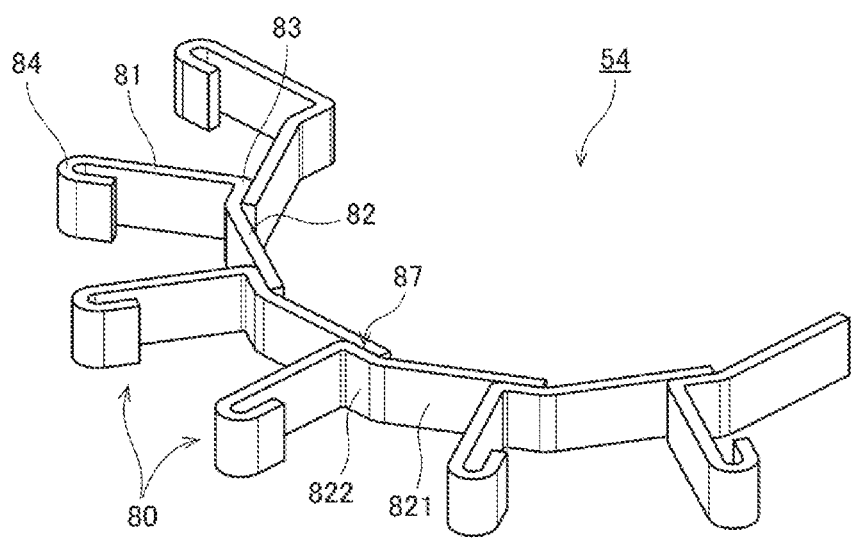
FIG. 7 is a perspective view of a neutral point bus bar according to a second embodiment.

FIG. 6 is a top view of the neutral point bus bar 54. FIG. 7 is a perspective view of the neutral point bus bar 54. As illustrated in FIGS. 6 and 7, the neutral point bus bar 54 is configured by combining a plurality of bus bar members 80 made of a metal material. In this embodiment, the plurality of bus bar members 80 have the same shape. These bus bar members 80 are preferably connected to each other by welding.

Figure 8:
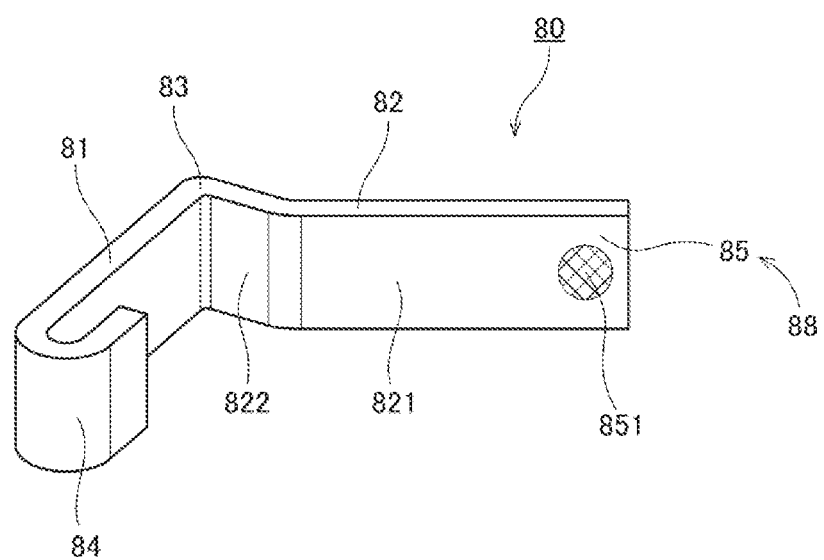
FIG. 8 is a perspective view of a bus bar member according to a second embodiment.
Figure 9:
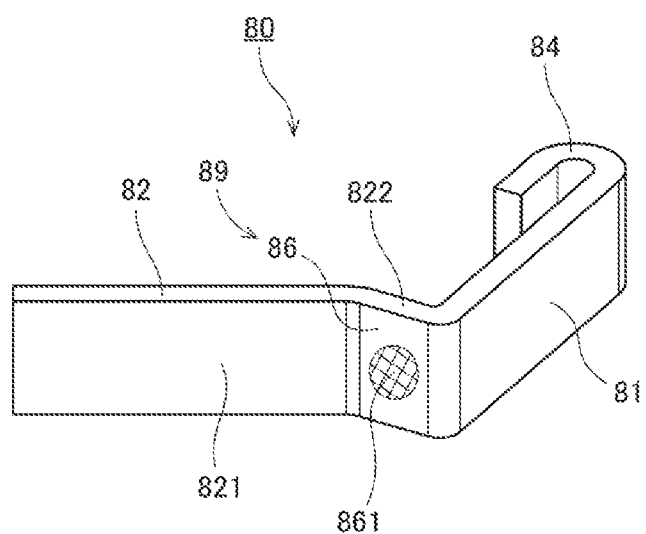
FIG. 9 is a perspective view of a bus bar member according to a second embodiment.

FIGS. 8 and 9 are perspective views of the single bus bar member 80. As illustrated in FIGS. 8 and 9, the bus bar member 80 is configured of a board bent only in a thickness direction. Each of the bus bar members 80 has radial branches 81 and circumferential branches 82. When being incorporated in the motor 1, the circumferential branch 82 is expanded in the circumferential direction with respect to the center axis 9. When being incorporated in the motor 1, the radial branch 81 extends radially outward from one end portion of the circumferential branch 82. The radial branch 81 and the circumferential branch 82 are bent at a boarder defined by a bent portion 83. That is, the bus bar member 80 has the bent portion 83 between the one end portion of the circumferential branch 82 and the one end portion of the radial branch 81. Further, when being incorporated in the motor 1, the radial branch 81 may extend radially inward from the one end portion of the circumferential branch 82.

According to this embodiment, the plurality of bus bar members 80 all are a bent bus bar member which has the radial branch 81, the circumferential branch 82, and the bent portion 83. A waste of material may be reduced by configuring the neutral point bus bar 54 by combining the bent bus bar members obtained from the board made of a metal material. However, among the plurality of bus bar members 80, a bus bar member having a different shape from the bent bus bar member may be included.

The radial branch 81 has a terminal portion 84 provided at the other end portion of an opposite side to the bent portion 83. Viewed from the top, the terminal portion 84 is curved in a U-letter shape. A tip of the terminal portion 84 is directed radially inward. When being incorporated in the motor 1, the terminal portion 84 becomes one of the plurality of neutral point terminals 541 to 546. Further, the terminal portion 84 is not limited to a shape curved in the U-letter shape and may have any shape which may be electrically connected to the lead wire 431.

The circumferential branch 82 has a first plate-shaped portion 821 and a second plate-shaped portion 822. The first plate-shaped portion 821 is expanded in a flat shape along substantially the circumferential direction from the other end portion of an opposite side to the bent portion 83 of the circumferential branch 82. The second plate-shaped portion 822 is expanded in the flat shape along substantially the circumferential direction between the first plate-shaped portion 821 and the bent portion 83. As such, when both the first plate-shaped portion 821 and the second plate-shaped part 822 have a flat shape, a first connection surface 85 and a second connection surface 86 to be described below become a plane. For this reason, compared to the case in which the first connection surface 85 and the second connection surface 86 are a curved surface, the contact between the first connection surface 85 and the second connection surface 86 is stabilized. Therefore, the first connection surface 85 and the second connection surface 86 may be easily welded to each other.

When the neutral point bus bar 54 is manufactured, the surface (hereinafter, referred to as the [first connection surface 85]) on a radially outer side near the other end portion of the first plate-shaped portion 821 of the bus bar member 80 and the surface (hereinafter, referred to as the [second connection surface 86]) on a radially inner side of the second plate-shaped portion 822 of the other bus bar member 80 contact each other. In this case, a height in an axial direction of the first connection surface 85 coincides with a height in an axial direction of the second connection surface 86. Further, the first connection surface 85 and the second connection surface 86 are welded to each other. By doing so, the two bus bar members 80 are firmly fixed and at the same time are electrically connected to each other. The plurality of bus bar members 80 are continued in the circumferential direction by sequentially performing the welding on the plurality of bus bar members 80. As a result, as illustrated in FIGS. 6 and 7, the neutral point bus bar 54 which is a single conductor is obtained.

According to this embodiment, a first connection portion 88 has the first connection surface 85 of the bus bar member 80. A second connection portion 89 has the second connection surface 86 of the other bus bar member 80. The first connection portion 88 and the second connection portion 89 are connected to each other by the welding. The first connection portion 88 and the second connection portion 89 are welded to each other to configure a connection portion 87. The connection portion 87 is a portion thermally deformed by the welding and is a portion at which the two bus bar members 80 are connected to each other.

The first connection surface 85 and the second connection surface 86 are preferably connected to each other by a resistance welding. Compared to the case of using other welding methods, the first connection surface 85 and the second connection surface 86 may be easily connected to each other by using the resistance welding. Further, as illustrated in cross hatching in FIGS. 8 and 9, the first connection surface 85 and the second connection surface 86 are connected to each other in substantially circular resistance welding areas 851 and 861 by the resistance welding. Therefore, an upper edge and a lower edge of the bus bar member 80 are hardly deformed by the welding.

Figure 10:
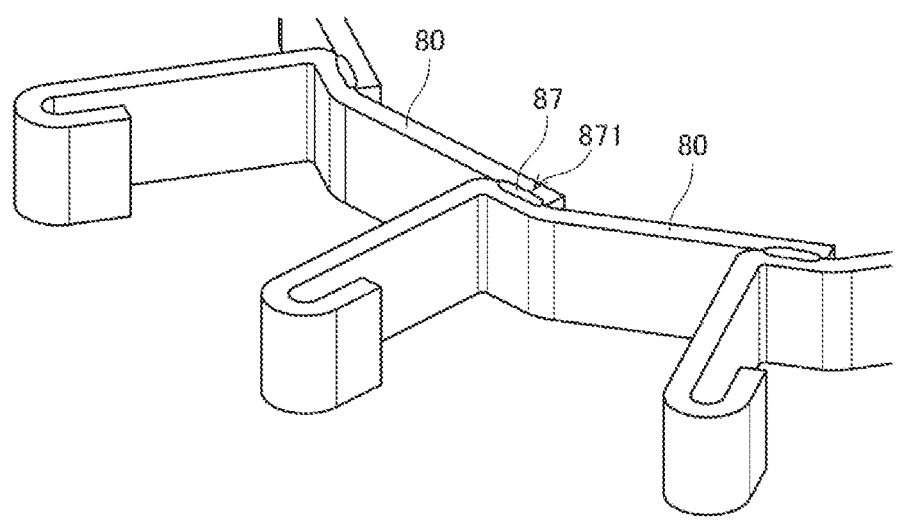
FIG. 10 is a partial perspective view of the neutral point bus bar in the case of using arc welding.

Further, in addition to the resistance welding, the first connection portion 88 and the second connection portion 89 may be connected to each other by using arc welding such as TIG welding. As illustrated in FIG. 10, the arc welding may be performed on the edge portions, etc., of the bus bar member 80. In FIG. 10, the edge portions of the two adjacent bus bar members 80 in a TIG welding area 871 in which the welding is performed are thermally deformed by the welding to be connected to each other. Further, the connected portion is the connection portion 87. However, the TIG welding area 871 is not limited to the edge portion of the bus bar member 80 and may be portions adjacent to each other of the two bus bar members 80.

Here, as illustrated in FIG. 6, an angle range around the center axis 9 occupied by the neutral point bus bar 54 after the welding is θo, the number of terminal portions included in the neutral point bus bar 54 is m, and an angle smaller than a plane angle formed by the surface of the center axis 9 of the first plate-shaped portion 821 and the second connection surface 86 is θa. Here, one interior angle of a regular polygon in which the first plate-shaped portion 821 of the each bus bar member 80 is defined as one side is same, and therefore the angle θa satisfies the following Equation 1. In this embodiment, θo≈180°, m=6, θa≈150°, which satisfies the following Equation 1.

$$\theta a \approx \pi - \theta o/m \quad (1)$$

In this embodiment, the first welding surface 85 is overlappingly welded with the second connection surface 86 in the radial direction with respect to the center axis 9. For this reason, the radial position of each of the bus bar members 80 is defined by the neighboring bus bar member 80. Therefore, a position shift hardly occurs in the radial direction of the bus bar members 80. When the first connection surface 85 overlaps with the second connection surface 86 in the circumferential direction, there is a need to expand the bus bar holder 55 in the radial direction to cover the corresponding connection portion 87 when expanding an area of the connection portion 87. However, an area of the connection portion 87 is limited since there is a need to expose the terminal portion 84. In contrast, when the first connection surface 85 is configured to overlap with the second connection surface 86 in the radial direction, there is no need to expand the bus bar holder 55 in the radial direction to cover the connection portion 87. Therefore, compared to the case in which the first connection surface 85 and the second connection surface 86 overlap with each other in the circumferential direction, the area of the connection portion 87 may be expanded. For this reason, the first connection portion 88 and the second connection portion 89 may be more firmly connected to each other.

<2-4. Manufacturing Sequence of Bus Bar Unit>

Figure 11:
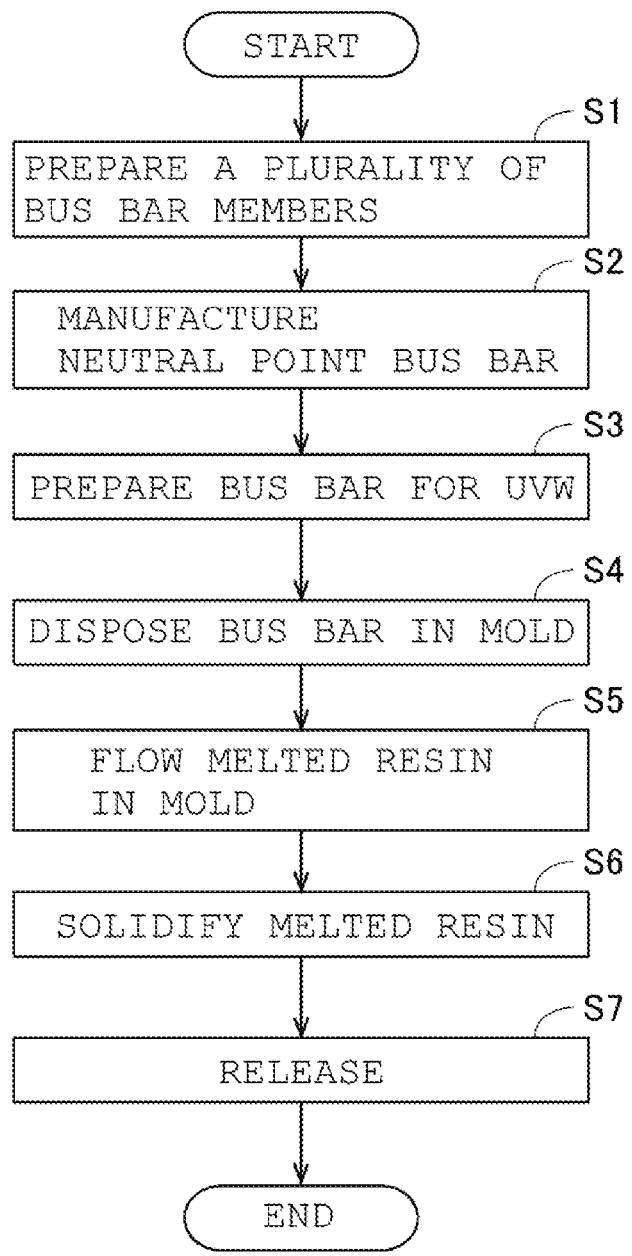
FIG. 11 is a flow chart of a manufacturing sequence of the bus bar unit according to the second embodiment.

FIG. 11 is a flow chart illustrating a manufacturing sequence of the bus bar unit 23. When the bus bar unit 23 is manufactured, first, the plurality of bus bar members 80 are prepared (step S1). Each of the bus bar members 80 is obtained by bending the board made of a metal material in the thickness direction by a press machine. Each of the bus bar members 80 may be easily obtained by bending a metal plate only in the thickness direction. Further, each of the bus bar members 80 may be precisely manufactured.

Next, the neutral point bus bar 54 is manufactured by connecting the plurality of bus bar members 80 to each other (step S2). Here, as described above, the first connection surfaces 85 of each of the bus bar member 80 are welded to the second connection surfaces 86 of the bus bar members 80 adjacent thereto. By doing so, the neutral point bus bar 54, which is the single conductor, is obtained.

Next, the U phase bus bar 51, the V phase bus bar 52, and the W phase bus bar 53 are prepared (step S3). The U phase bus bar 51, the V phase bus bar 52, and the W phase bus bar 53, for example, are obtained by bending the board made of a metal material by the press machine. Further, timing when the U phase bus bar 51, the V phase bus bar 52, and the W phase bus bar 53 are prepared may be prior to steps S1 and S2 and may be simultaneous with steps S1 and S2.

If the U phase bus bar 51, the V phase bus bar 52, the W phase bus bar 53, and the neutral point bus bar 54 are prepared, next, these bus bars 51 to 54 are disposed at the inside of a mold for resin molding (step S4). Here, at least a portion of the respective bus bars 51 to 54 are disposed in cavities formed by a pair of molds vertically disposed. For the neutral point bus bar 54, at least a portion of the connection portion 87 is disposed in the cavity of the mold.

Next, a melted resin flows in the cavity of the mold (step S5). The melted resin flows from a gate provided in the mold and is spread into the cavity while contacting the U phase bus bar 51, the V phase bus bar 52, the W phase bus bar 53, and a surface of the neutral point bus bar 54.

When the melted resin is widely spread into the cavity of the mold, the melted resin in the mold is cooled and solidified (step S6). The melted resin in the mold is solidified to become the bus bar holder 55. Further, the melted resin is solidified and thus the U phase bus bar 51, the V phase bus bar 52, the W phase bus bar 53, the neutral point bus bar 54, and the bus bar holder 55 are fixed to one another. By doing so, the bus bar unit 23 is obtained.

Next, the pair of molds are opened and the bus bar unit 23 is released from the mold (step S7).

According to this embodiment, the bus bar unit 23 is obtained by the insert molding. The molding of the bus bar holder 55 and the fixing of the bus bar holder 55 to each of the bus bars 51 to 54 may be simultaneously performed by using the insert molding. Therefore, compared to the case in which only the bus bar holder 55 is molded and then each of the bus bars 51 to 54 are fixed to the corresponding bus bar holder 55, the number of manufacture processes of the bus bar unit 23 may be reduced.

At least a portion of the connection portion 87 may be completely covered with resin configuring the bus bar holder 55 by using the insert molding. For this reason, the fixing strength of the connection portion 87 against the shock may be more increased.

<3. Modification Example>

Hereinabove, the exemplary embodiment of the present disclosure is described but the present disclosure is not limited the above-mentioned embodiments.

Figure 12:
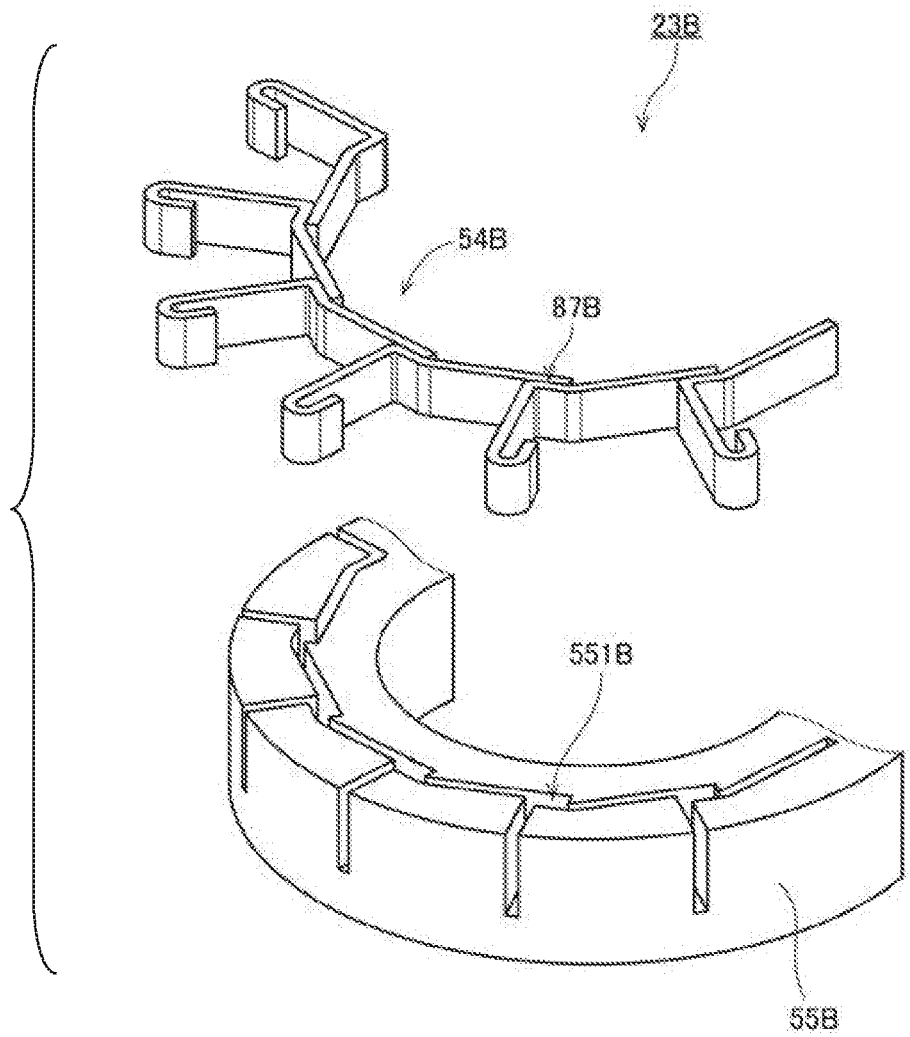
FIG. 12 is a partial exploded perspective view of a bus bar unit according to a modification example.

FIG. 12 is a partial exploded perspective view of a bus bar unit 23B according to one modification example. In FIG. 12, a bus bar holder 55B is molded separately from a neutral point bus bar 54B. The bus bar holder 55B has a bus bar holding groove 551B depressed downward from an upper surface thereof. Further, after the bus bar holder 55B is molded, the neutral point bus bar 54B is inserted into the bus bar holding groove 551B. In this case, at least a portion of a connection portion 87B of the neutral point bus bar 54B is disposed in the bus bar holding groove 551B. By doing so, the neutral point bus bar 54B may be held in the bus bar holder 55B without performing the insert molding having a high degree of difficulty.

Figure 13:
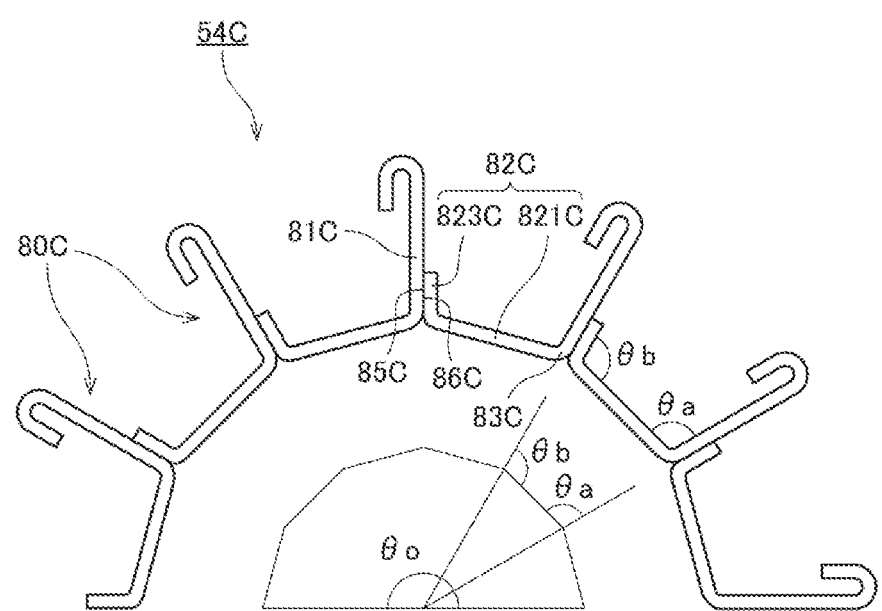
FIG. 13 is a top view of a neutral point bus bar according to another modification example.

FIG. 13 is a top view of a neutral point bus bar 54C according to another modification example. In FIG. 13, circumferential branches 82C of each of the bus bar members 80C have third plate-shaped portions 823C. The third plate-shaped portion 823C is expanded radially inward in a flat shape from an end portion of an opposite side to a bent portion 83C of a first plate-shaped portion 821C. Further, the third plate-shaped portion 823C is welded to a radial branch 81C of the adjacent bus bar member 80C. That is, in FIG. 13, the third plate-shaped portion 823C has a first connection surface 85C. The radial branch 81C has a second connection surface 86C around an end portion of the bent portion 83. For this reason, the first connection surface 85C and the second connection surface 86C overlap with each other in the circumferential direction.

In FIG. 13, the angle range around the center axis occupied by the neutral point bus bar 54 after the welding is $\theta o$, the number of terminal portions included in the neutral point bus bar 54C is m, an angle smaller than a plane angle formed by the surface of the center axis of the first plate-shaped portion 821C and the second connection surface 86C is $\theta a$, and an angle smaller than a plane angle formed by the surface of the center axis of the first plate-shaped portion 821C and the first connection surface 85C is $\theta b$. Next, both of the angle $\theta a$ and the angle $\theta b$ are equal as a supplementary angle of a base angle of an isosceles triangle formed by connecting the first plate-shaped portions 821C of each of the bus bar members 80C to the center axis. Therefore, they satisfy the following Equation 2. In the example of FIG. 13, $\theta o \approx 180°$, m=6, $\theta a \approx \theta b \approx 105°$, which satisfies the following Equation 2.

$$\theta a \approx \theta b \approx (\pi + \theta o/m)/2 \qquad (2)$$

Figure 14:
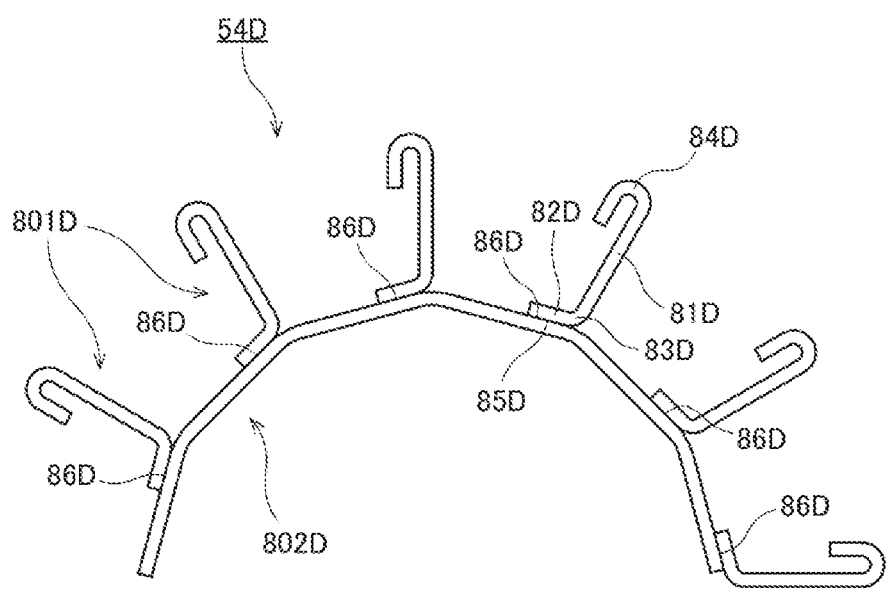
FIG. 14 is a top view of a neutral point bus bar according to another modification example.

FIG. 14 is a top view of a neutral point bus bar 54D according to another modification example. The neutral point bus bar 54D of FIG. 14 has a plurality of first bus bar members 801D and a second bus bar member 802D. Similar to the bus bar member 80 of the above-mentioned embodiment, the first bus bar member 801D is a bent bus bar member having a radial branch 81D, a circumferential branch 82D, and a bent portion 83D. However, a length in the circumferential direction of the circumferential branch 82D is shorter than that of the circumferential branch 82 of the above-mentioned embodiment. The radial branch 81C has a terminal portion 84D provided at the end portion of an opposite side to the bent portion 83C.

Meanwhile, the second bus bar member 802D has a different shape from the first bus bar member 801D. As illustrated in FIG. 14, the second bus bar member 802D extends in a substantially circumferential direction with respect to the center axis of the motor.

In FIG. 14, a surface on a radially inner side of the circumferential branch 82D of the first bus bar member 801D is a first connection surface 85D. The second bus bar member 802D has a plurality of second connection surfaces 86D provided on a surface on a radially outer side thereof. Further, the first connection surfaces 85D of each of the second bus bar members 80D are welded to the plurality of second connection surfaces 86D. By adopting the structure of FIG. 14, any portion of the surface on a radially outer side of the second bus bar member 802D may be connected to the first bus bar member 801D. Therefore, even when the interval in the circumferential direction of the terminal portion 84D is not constant, the correspondence may be established.

Figure 15:
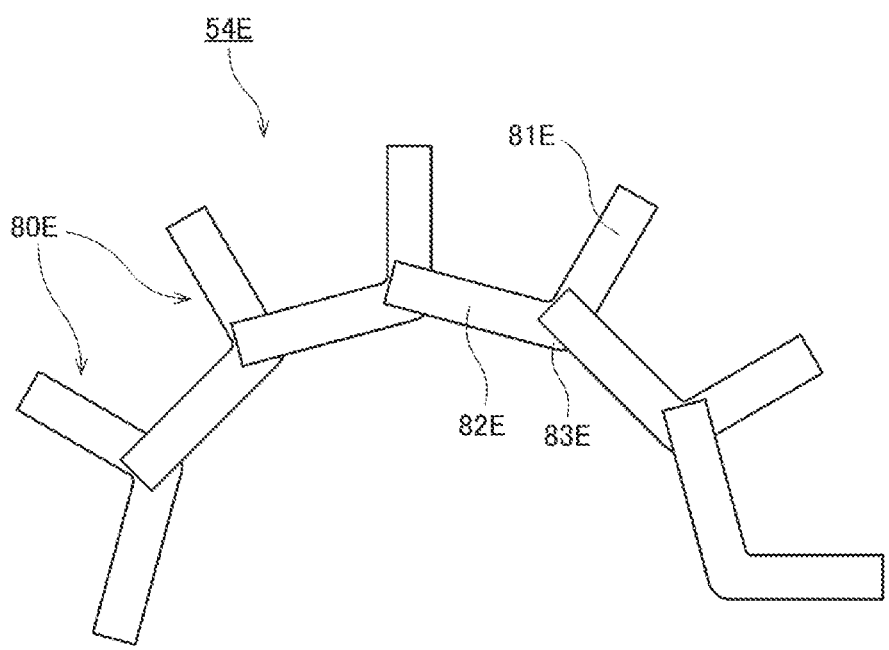
FIG. 15 is a top view of a neutral point bus bar according to another modification example.

FIG. 15 is a top view of a neutral point bus bar 54E according to another modification example. In FIG. 15, a plurality of bus bar members 80E suffers from the bending machining in a direction along a plate surface, not in the thickness direction of the plate. That is, the bent bus bar member is obtained by bending the board of a metal material in a direction along a plate surface by the press machine, etc. The bent bus bar member has a bent bus bar member having a radial branch 81E, a circumferential branch 82E, and a bent portion 83E. Further, lower surfaces of the circumferential branches 82E of each of the bus bar members 80E are welded to upper surfaces of the adjacent bus bar members 80E. Therefore, the first connection portion overlaps with the second connection portion in the axial direction with respect to the center axis of the motor. By doing so, an axial dimension of the neutral point bus bar 54E may be more suppressed.

In FIG. 15, the bent bus bar member is obtained by bending machining the plurality of bus bar members 80E in the direction along the plate surface, not in the thickness direction of the plate. However, the board having the bent shape may be perforated by the press machine, etc., to obtain the bent bus bar member.

According to the above-mentioned embodiment, the neutral point bus bar 54 does not overlap with other bus bars 51 to 53 in the radial direction. However, the neutral point bus bar may be disposed to overlap with other bus bars in the radial direction. However, when other bus bars are provided on a radially inner side of the neutral point bus bar is provided with other bus bars, each terminal portion of the neutral point bus bar may be disposed on a radially outer side of the first connection portion 88. When other bus bars are provided on a radially outer side of the neutral point bus bar is provided with other bus bars, each terminal portion of the neutral point bus bar may be disposed on a radially inner side of the first connection portion 88. That is, each terminal portion of the neutral point bus bar may be disposed at the opposite side to other bus bars with respect to the first connection portion 88. By doing so, the plurality of bus bars may be effectively arranged as a whole.

According to the above-mentioned embodiment, the first connection portion is welded to the second connection portion. However, the first connection portion may be connected to the second connection portion by methods other than the welding. For example, the first connection portion and the second connection portion may be connected to each other by soldering or caulking, etc. In the case of using the soldering, a portion to which lead of the first connection portion is attached, and a portion to which lead and lead of the second connection portion are attached become the connection portion. Further, in the case of using the caulking, the portions contacting each other by the caulking becomes the connection portion of the adjacent bus bar members.

The embodiment describes the example in which the present disclosure is applied to the neutral point bus bar, but the structure of the present disclosure may be applied the U phase bus bar, the V phase bus bar, or the W phase bus bar.

The present disclosure may be used in, for example, the bus bar unit and the motor.

While embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A bus bar unit used in a motor comprising a coil, the bus bar comprising:
   a bus bar electrically connected to the coil of the motor;
   a bus bar holder comprising a resin material and configured to hold the bus bar,
   wherein the bus bar comprises a plurality of bus bar members comprising a metal material,
   the plurality of bus bar members comprises a first bus bar member which has a terminal portion connected to a lead wire configuring the coil, and a first connection portion; and
   a connection portion is configured by connecting the first connection portion of the first bus bar member and a second connection portion provided in a second bus bar member which is the other one of the plurality of bus bar members, and at least a portion of the connection portion of the bus bar is held in the bus bar holder, and
   the first bus bar member is a bent bus bar member which has a radial branch extending in a radial direction, a circumferential branch expanding in a circumferential direction, and a bent portion interposed between one end portion of the radial branch and one end portion of the circumferential branch.

2. The bus bar unit of claim 1,
   wherein at least a part of the first connection portion and the second connection portion contact the bus bar holder.

3. The bus bar unit of claim 1,
   wherein the terminal portion is positioned at one of both ends of the bus bar, and the first connection portion is positioned at the other end of both ends of the bus bar.

4. The bus bar unit of claim 3,
   wherein the first bus bar member and the second bus bar member have different shapes,
   wherein the second bus bar member extends in a substantially circumferential direction with respect to the center axis of the motor,
   wherein the second bus bar member has the second connection surface provided on a surface on a radially outer side thereof,
   wherein the bus bar has plurality of the first bus bar members, and
   wherein the second bus bar having a single surface being connected to plural surfaces of respective plural first bus bar members.

5. The bus bar unit of claim 3,
   wherein the first connecting portion has a first connecting surface, the second connecting portion has a second connecting surface, and the first connecting surface and the second connecting surface are connected.

6. The bus bar unit of claim 2,
   wherein a height in a axial direction of the first connection surface is equal to that in the axial direction of the second connection surface.

7. The bus bar unit of claim 1,
   wherein the bus bar holder is molded separately from the first bus bar member and the second bus bar member.

8. The bus bar unit of claim 1,
   wherein the first connection portion is welded to the second connection portion.

9. The bus bar unit of claim 1,
   wherein the first connection portion and the second connection portion overlap with each other in a radial direction with respect to the a center axis.

10. The bus bar unit of claim 1,
    wherein the first connection portion and the second connection portion overlap with each other in a circumferential direction with respect to the a center axis.

11. The bus bar unit of claim 1,
    wherein the first connection portion overlaps with the second connection portion in an axial direction with respect to a center axis.

12. The bus bar unit of claim 1,
    wherein a shape of the first bus bar member is a plate including surfaces perpendicular to a thickness direction, and
    the first bus bar member is bent in a direction along the surfaces.

13. The bus bar unit of claim 1,
    wherein a shape of the first bus bar member is a plate including surfaces perpendicular to a thickness direction, and
    the first bus bar member is bent in the thickness direction.

14. The bus bar unit of claim 1,
    wherein a shape of the second bus bar member is a plate including surfaces perpendicular to a thickness direction, and
    the second bus bar member is bent in the thickness direction.

15. The bus bar unit of claim 1,
    wherein the first bus bar member and the second bus bar member are for U phase, V phase, or W phase.

16. A motor, comprising:
    a stationary unit; and
    a rotary unit rotatably supported on a center axis,
    wherein the stationary unit comprises:
    a plurality of coils arranged in a circumferential direction with respect to the center axis, and
    the bus bar unit as claimed in claim 1, and
    the rotary unit comprises:
    magnets facing magnetic cores of the plurality of coils.

17. The bus bar unit of claim 1, wherein the connection portion is completely covered with resin configuring the bus bar holder by using the insert molding.

* * * * *